United States Patent
Silva et al.

(10) Patent No.: US 10,902,135 B1
(45) Date of Patent: Jan. 26, 2021

(54) THWARTING DATA LEAKAGE FROM A WEBPAGE

(71) Applicant: SYMANTEC CORPORATION, Mountain View, CA (US)

(72) Inventors: David Luz Silva, Swords (IE); Johann Roturier, Maynooth (IE)

(73) Assignee: NORTONLIFELOCK INC., Tempe, AZ (US)

(*) Notice: Subject to any disclaimer, the term of this patent is extended or adjusted under 35 U.S.C. 154(b) by 129 days.

(21) Appl. No.: 16/143,100

(22) Filed: Sep. 26, 2018

(51) Int. Cl.
*G06F 7/04* (2006.01)
*G06F 21/60* (2013.01)
*H04L 29/06* (2006.01)

(52) U.S. Cl.
CPC .......... *G06F 21/604* (2013.01); *H04L 63/20* (2013.01)

(58) Field of Classification Search
CPC ......... G06F 16/904; G06F 2203/04803; H04L 41/0253; H04L 29/08666
USPC .......................................................... 726/27
See application file for complete search history.

(56) References Cited

U.S. PATENT DOCUMENTS

2018/0219849 A1* 8/2018 Jones .................... H04L 29/08

OTHER PUBLICATIONS

Fredrikson et al, 2011, REPRIV: Re-Imagining Content Personalization and In-Browser Privacy, IEEE, pp. 131-146.*

(Continued)

*Primary Examiner* — Alexander Lagor
*Assistant Examiner* — Jenise E Jackson
(74) *Attorney, Agent, or Firm* — Maschoff Brennan

(57) ABSTRACT

Thwarting data leakage from a webpage. In some embodiments, a method may include detecting, at a browser on the network device, a visit to the webpage, directing a headless browser on the network device to visit the webpage in parallel to the browser visiting the webpage, detecting, at the headless browser, data leakage from the webpage, presenting, at the browser, a notification regarding the data leakage that allows a user to indicate whether the data leakage should be allowed, receiving, at the browser, an indication that the data leakage should not be allowed, and in response to receiving the indication that the data leakage should not be allowed, thwarting the data leakage by performing a remedial action at the network device to protect the network device from the data leakage.

20 Claims, 3 Drawing Sheets

(56) References Cited

OTHER PUBLICATIONS

Choi et al, HXD: Hybrid XSS Detection by Using a Headless Browser, 2017, IEEE, pp. 1-4.*
Yuan et al, A XSS Vulnerability Detection Approach Based on Simulating Browser Behavior, 2015, IEEE, pp. 1-4.*
Cliqz; "Who Tracks Me—Trackers Rank"; Sep. 18, 2018; webpage located at: https://whotracks.me/trackers.html; accessed on Sep. 26, 2018; 8 pages.
Evidon; "Trackermap. Complete transparency"; webpage located at: https://www.evidon.com/solutions/trackermap/; accessed on Sep. 26, 2018; 2 pages.
Snyk; "Snyk is Now Integrated with Chrome's Lighthouse"; 2018; webpage located at: https://snyk.io/blog/snyk-and-lighthouse; accessed on Sep. 26, 2018; 3 pages.
Princeton.edu; "Data release: list of websites that have third-party "session replay" scripts"; webpage located at: https://webtransparency.cs.princeton.edu/no_boundaries/session_replay_sites.html; accessed on Sep. 26, 2018; 2 pages.
URLScan.IOv0.3; "urlscan.io—Recent scans"; Sep. 26, 2018; webpage located at: https://urlscan.io/; accessed on Sep. 26, 2018; 1 page.
Symantec Corporation; "Norton—Safe Web"; 2015-2018; webpage located at: https://safeweb.norton.com/; accessed on Sep. 26, 2018; 1 page.

* cited by examiner

THWARTING DATA LEAKAGE FROM A WEBPAGE

BACKGROUND

A webpage is a document written in a standard markup language that is typically downloaded to a local network device over the World Wide Web of the Internet from a web server. Once downloaded, the webpage is then rendered to a user of the local network device in an application known as a web browser (or simply a "browser"). When a webpage that was downloaded from a webserver is rendered in a browser, the webpage may have sub-resources that are downloaded from, or are associated with, third-party systems, such as ad network webservers, Content Distribution Network webservers, third party analytics webservers, etc. Allowing a browser to render a webpage with third-party sub-resources may add dynamic functionality to the webpage, thus making the webpage more useful to the owner of the webpage or to a user.

One problem with a webpage using third-party sub-resources is the potential for the privacy of a user, and the security of the user's network device, to be compromised without the user's knowledge or consent. For example, a webpage may appear to provide one set of functionality to a user, but unbeknownst to the user the webpage may be using third-party sub-resources that leak data to a third-party system. Unfortunately, because the actions of third-party sub-resources in a webpage are often hidden from a user who is navigating the webpage, this data leakage may occur without the user's knowledge or consent, resulting in the privacy of the user, and the security of the user's network device, being compromised.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for thwarting data leakage from a webpage may be performed, at least in part, by a network device including at least one processor. The method may include detecting, at a browser on the network device, a visit to the webpage. The method may also include directing a headless browser on the network device to visit the webpage in parallel to the browser visiting the webpage. The method may further include detecting, at the headless browser, data leakage from the webpage. The method may also include presenting, at the browser, a notification regarding the data leakage that allows a user to indicate whether the data leakage should be allowed. The method may further include receiving, at the browser, an indication that the data leakage should not be allowed. The method may also include, in response to receiving the indication that the data leakage should not be allowed, thwarting the data leakage by performing a remedial action at the network device to protect the network device from the data leakage.

In some embodiments, the performing of the remedial action at the network device may include one or more of blocking the network device from communicating with a third-party system over a network, preventing data associated with the data leakage from being gathered at the webpage, or preventing data associated with the data leakage from being stored at the network device, or some combination thereof.

In some embodiments, the detecting, at the headless browser, of the data leakage from the webpage may include detecting, at the headless browser, the data leakage due to a third-party script of the webpage listening for input events on the webpage. In these embodiments, the input events may include one or more of keyboard input events, or mouse input events, or some combination thereof.

In some embodiments, the detecting, at the headless browser, of the data leakage from the webpage may include detecting, at the headless browser, the data leakage due to outbound data flows from the webpage to a third-party system. In these embodiments, the outbound data flows from the webpage to a third-party system may include an outbound request to a third-party domain that is different than a domain of the webpage.

In some embodiments, the detecting, at the headless browser, of data leakage from the webpage comprises detecting, at the headless browser, the data leakage to a third-party system that is configured to occur on the webpage without the data leakage being presented in the browser.

Also, in some embodiments, one or more non-transitory computer-readable media may include one or more computer-readable instructions that, when executed by one or more processors of a network device, cause the network device to perform a method for thwarting data leakage from a webpage.

Also, in some embodiments, a network device may include one or more processors and one or more non-transitory computer-readable media including one or more computer-readable instructions that, when executed by the one or more processors, cause the network device to perform a method for thwarting data leakage from a webpage.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

A webpage that is downloaded from a webserver may have sub-resources that are downloaded from or involve third-party systems, such as ad network webservers, Content Distribution Network webservers, third party analytics webservers, etc. Although allowing a browser on a user's network device to render a webpage with third-party sub-resources may add dynamic functionality to the webpage, thus making the webpage more useful to the owner of the webpage or to a user, third-party sub-resources also have the potential to compromise the privacy of the user, and the security of the user's network device, without the user's knowledge or consent. For example, a webpage may appear to provide visible functionality to a user, but unbeknownst to the user the webpage may be using third-party sub-resources to provide additional functionality, but this additional functionality may also leak data to a third-party system. Unfortunately, because the actions of third-party sub-resources in a webpage are often hidden from a user who is navigating the webpage, this data leakage may occur without the user's knowledge or consent, resulting in the privacy of the user, and the security of the user's network device, being compromised.

The embodiments disclosed herein may provide various benefits. In particular, the embodiments disclosed herein may, for example, enable the thwarting of data leakage from a webpage. In some embodiments, a leakage application on a user's network device may detect, at a browser on the network device, a visit by the user to a webpage, and then direct a headless browser on the network device to visit the webpage in parallel to the browser visiting the webpage. The leakage application may then detect, at the headless browser, data leakage from the webpage and present, at the browser, a notification regarding the data leakage that allows a user to indicate whether the data leakage should be allowed. Then, the leakage application may receive an indication from the user regarding whether the data leakage should be allowed. If so, the leakage application may allow the data leakage. But if not, the leakage application may thwart the data leakage by performing a remedial action at the network device to protect the network device from the data leakage.

In this manner, even where data leakage from a webpage is intended to be hidden from a user, some embodiments disclosed herein may employ a headless browser to visit the webpage in parallel and in real-time, detect data leakage, and then give the user a chance to authorize or prevent the data leakage. Thus, data leakage from a webpage rendered in a browser on a user's network device can be prevented in real-time, or limited in real-time to situations where the user has given consent, thus preserving the privacy of the user and the security of the user's network device.

Figure 1:
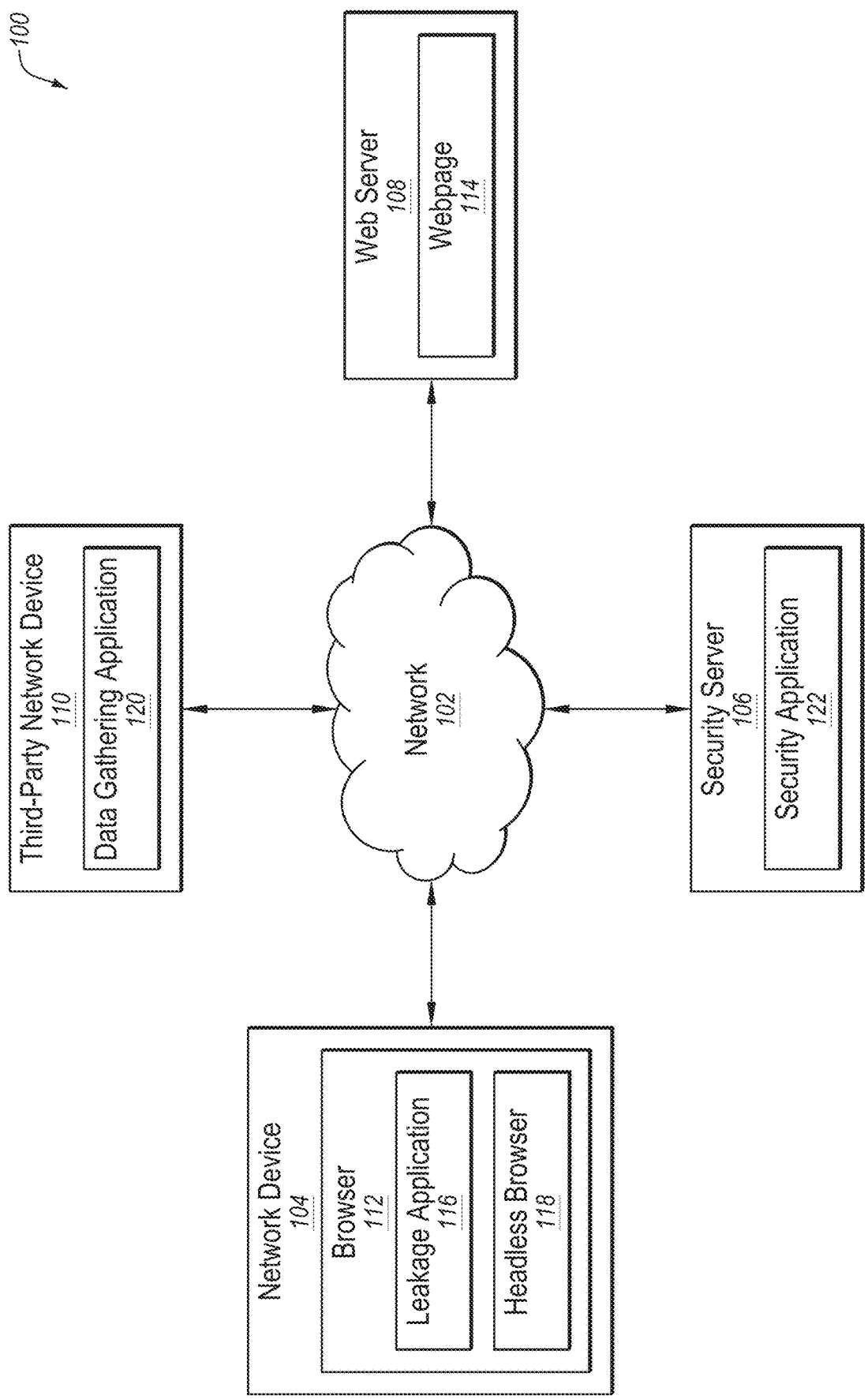
FIG. 1 illustrates an example system configured for thwarting data leakage from a webpage.

Turning to the figures, FIG. 1 illustrates an example system 100 configured for thwarting data leakage from a webpage. The system 100 may include a network 102, a network device 104, a security server 106, a web server 108, and a third-party network device 110.

In some embodiments, the network 102 may be configured to communicatively couple the network device 104, the security server 106, the web server 108, and the third-party network device 110 to one another as well as to other network devices and servers. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 3:
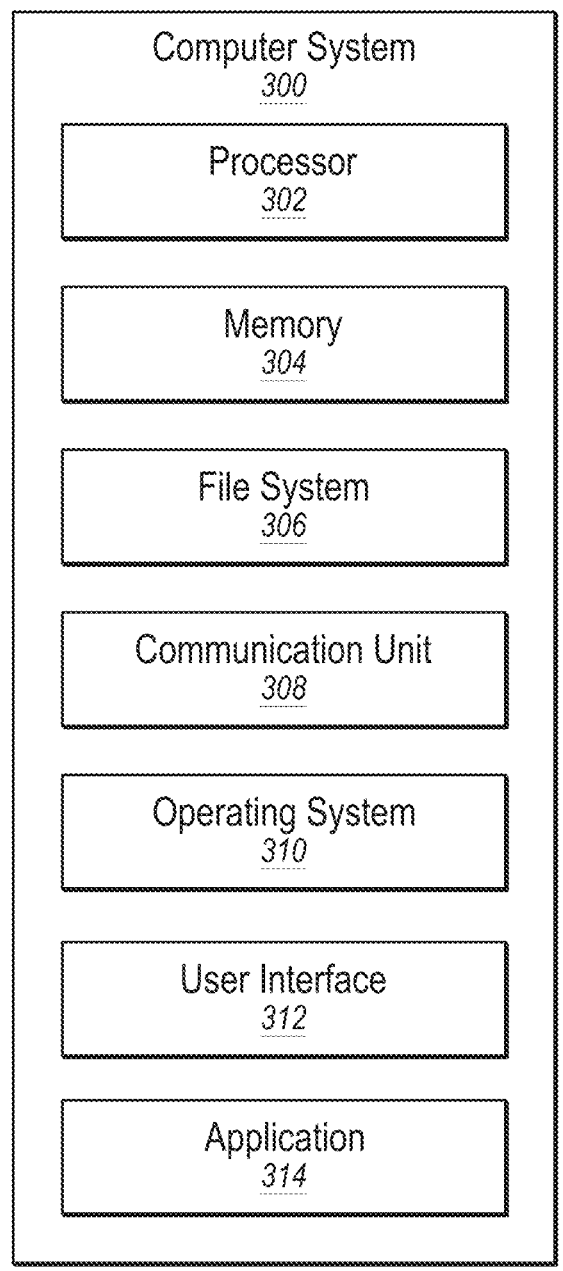
FIG. 3 illustrates an example computer system that may be employed in thwarting data leakage from a webpage.

In some embodiments, the network device 104 may be any computer system capable of communicating over the network 102 and executing a browser, examples of which are disclosed herein in connection with the computer system 300 of FIG. 3. The network device 104 may include a browser 112. The browser 112 may be configured to communicate with and render webpages (such as a webpage 114 hosted on the web server 108) in a graphical user interface for display to a user of the network device 104. In some embodiments, the browser 112 may be a standard off-the-shelf web browser such as, but not limited to, Google Chrome, Mozilla Firefox, Safari, Internet Explorer, or Microsoft Edge. The network device 104 may also include a leakage application 116. For example, the leakage application 116 may be a stand-alone application (such as a mobile device app), may be a browser extension or plugin of the browser 112, or may be integrated into the browser 112, or may be some combination thereof. In some embodiments, the leakage application 116 may include, or may be part of, Symantec Corporation's Norton Identity Safe application or Symantec Corporation's LifeLock Identity Theft Protection Mobile app. The network device 104 may further include a headless browser 118. The headless browser may have the same basic functionality as the browser 112 but without a graphical user interface. As such, the headless browser 118 may operate in parallel to the browser 112 without being displayed to the user. In some embodiments, the headless browser 118 may be a standard off-the-shelf headless browser such as, but not limited to, HtmlUnit, Ghost, Twill, PhantomJS, Awesomium, SimpleBrowser, ZombieJS, EnvJS, Puppeteer, Watir, or Spynner. The headless browser 118 may be a stand-alone application (such as a mobile device app), may be a browser extension or plugin of the browser 112, may be integrated into the browser 112, or may be integrated into the leakage application 116, or may be some combination thereof.

Figure 2:
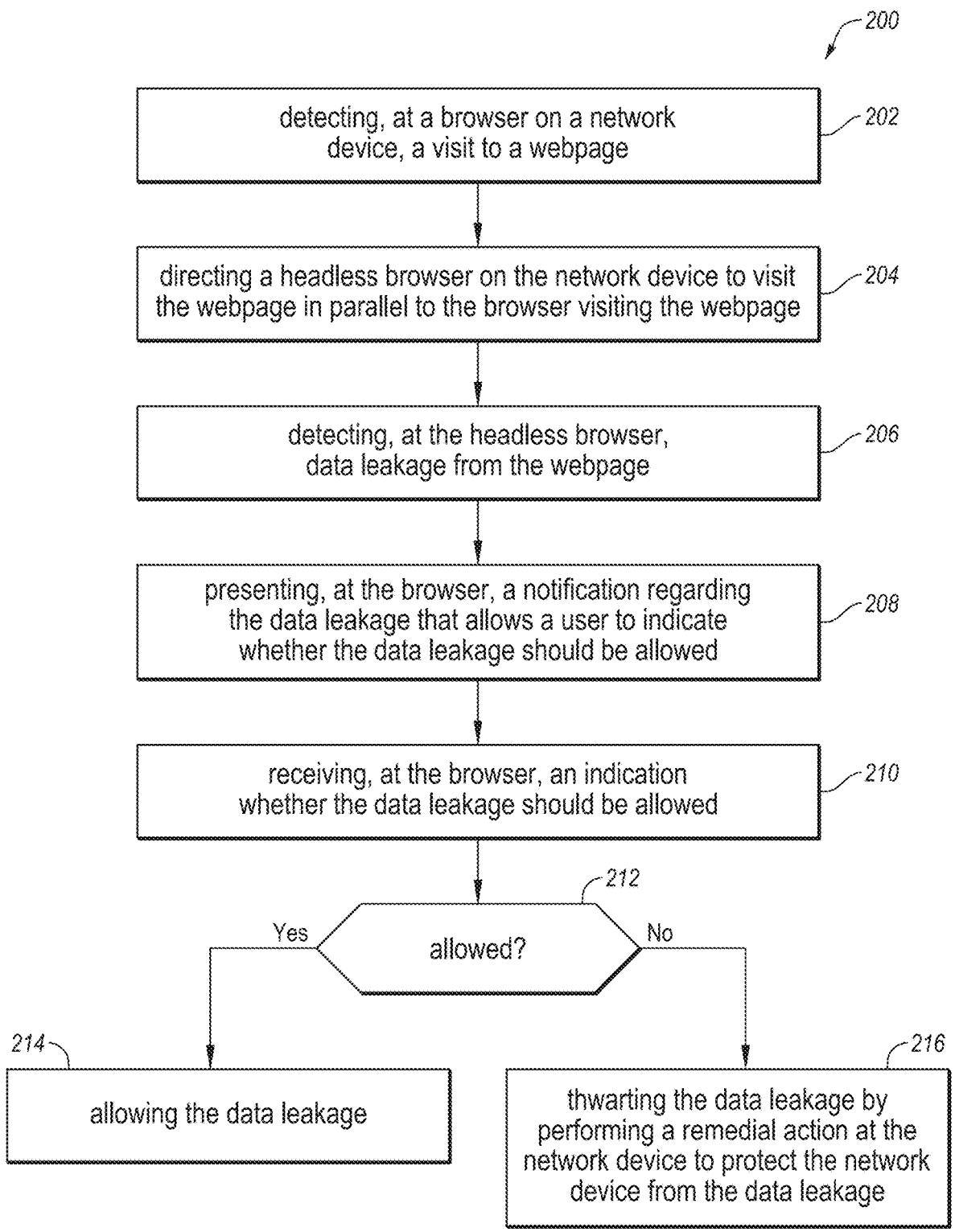
FIG. 2 is a flowchart of an example method for thwarting data leakage from a webpage.

In some embodiments, the leakage application 116 may be configured to perform one or more actions of the method 200 of FIG. 2. For example, the leakage application 116 may be configured to thwart data leakage from the webpage 114 (when visited by the user in the browser 112) to the third-party network device 110. In particular, the leakage application 116 may detect, at the browser 112, a visit by the user to the webpage 114, and then direct the headless browser 118 to visit the webpage 114 in parallel to the browser 112 visiting the webpage 114. The leakage application 116 may then detect, at the headless browser 118, data leakage from the webpage 114 to the third-party network device 110. For example, the headless browser 118 may be configured to set up request (e.g., GET, POST, or WS) interceptors to the third-party network device 110 on the webpage 114, extract third-party listeners per type on the webpage 114, perform authentication and/or authorization tests on the webpage 114, and/or track form submission on the webpage 114. The actions by the headless browser 118 may result, for example, in the headless browser 118 detecting third-party script listening to "key-pressed" events on the webpage 114, detecting outbound POST traffic for third-party systems on the webpage 114, detecting that basic authentication was or was not requested on the webpage 114, and detecting safe form submission (on simulation no outbound traffic) on the webpage 114.

Next, the leakage application 116 may next present, at the browser 112, a notification regarding the data leakage that allows a user to indicate whether the data leakage to the third-party network device 110 should be allowed. Then, the leakage application 116 may receive an indication from the user regarding whether the data leakage should be allowed. If so, the leakage application 116 may allow the data leakage. But if not, the leakage application 116 may thwart the data leakage by performing a remedial action at the network device 104 to protect the network device 104 from the data leakage. For example, this performing of the remedial action at the network device 104 may include one or more of blocking the network device 104 from communicating with the third-party network device 110 over the network 102, preventing data associated with the data leakage from being gathered at the webpage 114, or preventing data associated with the data leakage from being stored at the network device 104, or some combination thereof.

In this manner, even where data leakage from the webpage 114 to the third-party network device 110 is intended to be hidden from a user, the leakage application 116 may employ the headless browser 118 to visit the webpage 114 in parallel and in real-time, detect data leakage, and then give the user a chance to authorize or prevent the data leakage. Thus, data leakage to the third-party network device 110 from the webpage 114 rendered in the browser 112 on the network device 104 can be prevented in real-time, or limited in real-time to situations where the user has given consent, thus preserving the privacy of the user and the security of the network device 104.

In some embodiments, the security server 106 may be any computer system capable of communicating over the network 102 and capable of monitoring and protecting the network device 104 and/or the web server 108, examples of which are disclosed herein in connection with the computer system 300 of FIG. 3. In some embodiments, the security server 106 may include a security application 122 that may be configured to perform one or more actions of the method 200 of FIG. 2. Further, in some embodiments, the security application 122 may be configured to gather information generated by the leakage application 116 regarding data leakage from webpages, such as the webpage 114, in order to keep a database of the types of data leaked on different webpages, in order to rank webpage based on data leakage metrics for example.

In some embodiments, the web server 108 may be any computer system capable of communicating over the network 102 and capable of hosting a website addressable at a particular web domain having one or more webpages, examples of which are disclosed herein in connection with the computer system 300 of FIG. 3. The web server 108 may host the webpage 114.

In some embodiments, the third-party network device 110 may be any computer system capable of communicating over the network 102 and capable of gathering data leaked from webpages, examples of which are disclosed herein in connection with the computer system 300 of FIG. 3. In some embodiments, the third-party network device 110 may be, or include the functionality of, an ad network web server, a Content Distribution Network web server, or a third-party analytics webserver, or some combination thereof. In some embodiments, the third-party network device 110 may include a data gathering application 120. The data gathering application 120 may be configured to receive data leaked from the webpage 114 when the webpage 114 is rendered in the browser 112 on the network device 104. In some embodiments, the data gathering application 120 may be configured to gather leaked data due to a third-party script of the webpage 114 listening for input events (e.g., keyboard input events, mouse input events) on the webpage 114. In some embodiments, the data gathering application 120 may be configured to gather leaked data due to outbound data flows (e.g., HTTP POST requests) from the webpage 114 to a third-party network device 110. In some embodiments, a web domain of the third-party network device 110 may be different from a web domain of the webpage 114, which may enable the leakage application 116 to identify data being leaked to a system other than webpage 114 due to the different domain. In some embodiments, the data gathering application 120 may additionally or alternatively be, or may additionally or alternatively include the functionality of, one or more of a spyware, a virus, a worm, a logic bomb, a trapdoor, a Trojan horse, a Remote Admin Trojan (RAT), a malware, a mobile malicious code, a malicious font, and a rootkit.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

FIG. 2 is a flowchart of an example method 200 for thwarting data leakage from a webpage. The method 200 may be performed, in some embodiments, by a device or system, such as by the leakage application 116 of FIG. 1 or the security application 122 of FIG. 1, or some other application, or some combination thereof. In these and other embodiments, the method 200 may be performed by one or more processors based on one or more computer-readable instructions stored on one or more non-transitory computer-readable media. The method 200 will now be described in connection with FIGS. 1 and 2.

The method 200 may include an action 202 of detecting, at a browser on a network device, a visit to a webpage. For example, the leakage application 116 may detect, at the action 202, a visit by a user to the webpage 114 in the browser 112 of the network device 104. This visit to the webpage 114 in the browser 112 may have resulted, for example, from the user of the network device 104 clicking on a link corresponding to the web domain of the webpage 114, or from the user entering a URL corresponding to the web domain of the webpage 114 into an address field (e.g., an address bar) of the browser 112.

The method 200 may include an action 204 of directing a headless browser on the network device to visit the webpage in parallel to the browser visiting the webpage. For example, the leakage application 116 may direct, at the action 204, the headless browser 118 on the network device 104 to visit the webpage 114 in parallel to the browser 112 visiting the webpage 114, such that the headless browser 118 is visiting the webpage 114 in real-time while the browser 112 is visiting the webpage 114. In some embodiments, the headless browser 118 may additionally be configured to visit the webpage 114 slightly before the webpage 114 is completely rendered or completely functional within the browser 112 in order to allow the headless browser 118 a "head start" at performing the actions 206-216 of the method 200 prior to any data leakage on the webpage 114.

The method 200 may include an action 206 of detecting, at the headless browser, data leakage from the webpage. In some embodiments, the detecting, at the headless browser, of the data leakage from the webpage may include detecting, at the headless browser, the data leakage due to a third-party script of the webpage listening for input events on the webpage. In these embodiments, the input events may include one or more of keyboard input events, or mouse input events, or some combination thereof. Additionally or alternatively, in some embodiments, the detecting, at the headless browser, of the data leakage from the webpage may include detecting, at the headless browser, the data leakage due to outbound data flows from the webpage to a third-party system. In these embodiments, the outbound data flows from the webpage to a third-party system may include an outbound request to a third-party domain that is different than a domain of the webpage. In some embodiments, the detecting, at the headless browser, of data leakage from the webpage comprises detecting, at the headless browser, the data leakage to a third-party system that is configured to occur on the webpage without the data leakage being presented in the browser. For example, the leakage application 116 may detect, at the action 206, data leakage from the webpage 114 to the third-party network device 110, where the data leakage is configured to occur on the webpage 114 without the data leakage being presented in the browser 112, and is thus unbeknownst to the user. In this example, the leaked data may be due to a third-party script of the webpage 114 listening for input events (e.g., keyboard input events such as "keydown" or "keyup" or mouse input events such as "click," "mousedown," "mouseup," "dblclick," "scroll," and "auxclick") on the webpage 114. Additionally or alternatively, the leaked data in this example may be due to outbound data flows (e.g., HTTP POST requests) from the webpage 114 to the third-party network device 110. In some embodiments, the leaked data may be personally identifiable information (PII) of the user that is found on the webpage 114, such as data passed to the webpage 114 in a URL that links to the webpage 114, perhaps with broken or absent authentication allowing access by web crawlers or other link following systems. This PII may be identified by the leakage application 116 learning over time (using a machine learning classifier, for example) which types of leaked data the user disallows, learning over time from the user designating certain data as PII on the webpage 114 of multiple webpages, or the user entering PII into the leakage application 116 or granting access to PII of the user to the leakage application 116. In this example, PII may be ignored where it is found after a user has performed an authentication on the webpage 114 (because it may be appropriate for PII to appear on the webpage 114 post-authentication).

The method 200 may include an action 208 of presenting, at the browser, a notification regarding the data leakage that allows a user to indicate whether the data leakage should be allowed. For example, the leakage application 116 may present, at the action 208, a notification at the browser 112 regarding the data leakage that allows the user to indicate whether the data leakage to the third-party network device 110 should be allowed. The presentation of the notification may be in the form of a pop-up window, a banner, a separate window, or any other form of notification, which may be visual, audible, or tactile, or any combination thereof.

The method 200 may include an action 210 of receiving, at the browser, an indication whether the data leakage should be allowed. If so (yes at an action 212), the method may proceed to an action 214. Alternatively if not (no at an action 212), the method may proceed to an action 216. For example, the leakage application 116 may receive, at the action 210, an indication from the user in the browser 112 whether the data leakage to the third-party network device 110 should be allowed, such as by the user selecting either an "allow" or "prevent" button on a pop-up window that describes the data being leaked and to which third-party it is being leaked.

The method 200 may include an action 214 of allowing the data leakage. For example, the leakage application 116 may allow, at the action 214, the data leakage that was detected at the action 206 using the headless browser 118, in response to the user indicating that the data leakage should be allowed in the indication received at the action 210.

Alternatively, the method 200 may include an action 216 of thwarting the data leakage by performing a remedial action at the network device to protect the network device from the data leakage. In some embodiments, the performing of the remedial action at the network device may include one or more of blocking the network device from communicating with a third-party system over a network, preventing data associated with the data leakage from being gathered at the webpage, or preventing data associated with the data leakage from being stored at the network device, or some combination thereof. For example, the leakage application 116 may thwart, at the action 216, the data leakage, in response to the user indicating that the data leakage should not be allowed in the indication received at the action 210. This thwarting may include performing a remedial action at the network device 104 to protect the network device 104 from the data leakage. In this example, this performing of the remedial action at the network device 104 may include one or more of blocking the network device 104 from communicating with the third-party network device 110 over the network 102, preventing data associated with the data leakage from being gathered at the webpage 114, or preventing data associated with the data leakage from being stored at the network device 104, or some combination thereof.

In some embodiments, the method 200 may result in the thwarting of data leakage from the webpage 114 to a third-party network device 110. In particular, even where data leakage from the webpage 114 to the third-party network device 110 is intended to be hidden from a user, the method 200 may employ the headless browser 118 to visit the webpage 114 in parallel and in real-time, detect data leakage, and then give the user a chance to authorize or prevent the data leakage. Thus, the method 200 may result in data leakage to the third-party network device 110 from the webpage 114 rendered in the browser 112 on the network device 104 being prevented in real-time, or being limited in real-time to situations where the user has given consent, thus preserving the privacy of the user and the security of the network device 104.

Although the actions of the method 200 are illustrated in FIG. 2 as discrete actions, various actions may be divided into additional actions, combined into fewer actions, reordered, expanded, or eliminated, depending on the desired implementation. For example, in some embodiments, the actions 202, 204, and 206 may be performed without performing other actions of the method 200. Also, in some embodiments, the actions 202, 204, 206 and 208 may be performed without performing other actions of the method 200. Further, in some embodiments, the action 214 and/or action 216 may be may be performed by a network administrator or other entity that is different from the entity performing the other actions of the method 200.

Further, in some embodiments, one or more of the actions of the method 200, or additional action, may be performed by the security application 122 instead of the leakage application 116. For example, the security application 122 may be configured to monitor and protect the network device 104, and thus may be configured to perform the actions of the method 200, or perform some actions of the method 200 while the leakage application 116 performs other actions of the method 200. Also, in some embodiments, the method 200 may further include crawling the webpage 114 for links, detecting any data leakage at webpages corresponding to the links, presenting any data leakage at the webpages corresponding to the links to the user in the browser 112, and then, if the user indicates that the data leakage should not be allowed, thwarting the data leakage by performing a remedial action at the network device 104 to protect the network device 104 from the data leakage.

Further, it is understood that the method 200 may improve the functioning of a network device itself or a server itself, and improve the technical field of webpage data leakage detection and prevention. For example, the functioning of the network device 104 and/or the security server 106 and/or the web server 108 of FIG. 1 may itself be improved by the method 200, by employing a headless browser 118 to visit the webpage 114 in parallel and in real-time, to detect data leakage, and then give the user a chance to authorize or prevent the data leakage. Unlike conventional methods which may only notify a user of data leakage after the data leakage has already occurred, the method 200 may allow the user to be presented with data leakage in real-time while the user is visiting the webpage 114, thus providing the user a chance to authorize or prevent the data leakage before the data leakage has compromised the privacy of the user and the security of the user's network device 104.

FIG. 3 illustrates an example computer system 300 that may be employed in thwarting data leakage from a webpage. In some embodiments, the computer system 300 may be part of any of the systems or devices described in this disclosure. For example, the computer system 300 may be part of any of the network device 104, the security server 106, the web server 108, or the third-party network device 110 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the browser 112, the leakage application 116, the data gathering application 120, or the security application 122, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 may be part of the operating system 310 or may be part of an application of the computer system 300, or may be some combination thereof. In some embodiments, the application 314 may function as the browser 112, the leakage application 116, the data gathering application 120, or the security application 122 of FIG. 1, or in some combination thereof.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for thwarting data leakage from a webpage, at least a portion of the method being performed by a network device comprising at least one processor, the method comprising:
   detecting, at a browser on the network device, a first visit to the webpage;
   directing a headless browser on the network device to perform a separate second visit the webpage in parallel to the first visit to the webpage by the browser, the headless browser having the same functionality as the browser but without a graphical user interface;
   detecting, at the headless browser, data leakage from the webpage;
   presenting, at the browser, a notification regarding the data leakage that allows a user to indicate whether the data leakage should be allowed;
   receiving, at the browser, an indication that the data leakage should not be allowed; and
   in response to receiving the indication that the data leakage should not be allowed, thwarting the data leakage by performing a remedial action at the network device to protect the network device from the data leakage.

2. The method of claim 1, wherein the performing of the remedial action at the network device comprises one or more of blocking the network device from communicating with a third-party system over a network, preventing data associated with the data leakage from being gathered at the webpage, or preventing data associated with the data leakage from being stored at the network device, or some combination thereof.

3. The method of claim 1, wherein the detecting, at the headless browser, of the data leakage from the webpage comprises detecting, at the headless browser, the data leakage due to a third-party script of the webpage listening for input events on the webpage.

4. The method of claim 3, wherein the input events comprise one or more of keyboard input events, or mouse input events, or some combination thereof.

5. The method of claim 1, wherein the detecting, at the headless browser, of the data leakage from the webpage comprises detecting, at the headless browser, the data leakage due to outbound data flows from the webpage to a third-party system.

6. The method of claim 5, wherein the outbound data flows from the webpage to the third-party system comprise an outbound request to a third-party domain that is different than a domain of the webpage.

7. The method of claim 1, wherein the detecting, at the headless browser, of data leakage from the webpage comprises detecting, at the headless browser, the data leakage to a third-party system that is configured to occur on the webpage without the data leakage being presented in the browser or being known to the user.

8. One or more non-transitory computer-readable media comprising one or more computer-readable instructions that, when executed by one or more processors of a network device, cause the network device to perform a method for thwarting data leakage from a webpage, the method comprising:
   detecting, at a browser on the network device, a first visit to the webpage;
   directing a headless browser on the network device to perform a separate second visit the webpage in parallel to the first visit to the webpage by the browser, the headless browser having the same functionality as the browser but without a graphical user interface;
   detecting, at the headless browser, data leakage from the webpage;
   presenting, at the browser, a notification regarding the data leakage that allows a user to indicate whether the data leakage should be allowed;
   receiving, at the browser, an indication that the data leakage should not be allowed; and
   in response to receiving the indication that the data leakage should not be allowed, thwarting the data leakage by performing a remedial action at the network device to protect the network device from the data leakage.

9. The one or more non-transitory computer-readable media of claim 8, wherein the performing of the remedial action at the network device comprises one or more of blocking the network device from communicating with a third-party system over a network, preventing data associated with the data leakage from being gathered at the webpage, or preventing data associated with the data leakage from being stored at the network device, or some combination thereof.

10. The one or more non-transitory computer-readable media of claim 8, wherein the detecting, at the headless browser, of the data leakage from the webpage comprises detecting, at the headless browser, the data leakage due to a third-party script of the webpage listening for input events on the webpage.

11. The one or more non-transitory computer-readable media of claim 10, wherein the input events comprise one or more of keyboard input events, or mouse input events, or some combination thereof.

12. The one or more non-transitory computer-readable media of claim 8, wherein the detecting, at the headless browser, of the data leakage from the webpage comprises detecting, at the headless browser, the data leakage due to outbound data flows from the webpage to a third-party system.

13. The one or more non-transitory computer-readable media of claim 12, wherein the outbound data flows from the webpage to the third-party system comprise an outbound request to a third-party domain that is different than a domain of the webpage.

14. The one or more non-transitory computer-readable media of claim 8, wherein the detecting, at the headless browser, of data leakage from the webpage comprises detecting, at the headless browser, the data leakage to a third-party system that is configured to occur on the webpage without the data leakage being presented in the browser or being known to the user.

15. A network device comprising:
   one or more processors; and
   one or more non-transitory computer-readable media comprising one or more computer-readable instructions that, when executed by the one or more processors, cause the network device to perform a method for thwarting data leakage from a webpage, the method comprising:
      detecting, at a browser on the network device, a first visit to the webpage;
      directing a headless browser on the network device to perform a separate second visit the webpage in parallel to the first visit to the webpage by the browser, the headless browser having the same functionality as the browser but without a graphical user interface;
      detecting, at the headless browser, data leakage from the webpage;
      presenting, at the browser, a notification regarding the data leakage that allows a user to indicate whether the data leakage should be allowed;
      receiving, at the browser, an indication that the data leakage should not be allowed; and
      in response to receiving the indication that the data leakage should not be allowed, thwarting the data leakage by performing a remedial action at the network device to protect the network device from the data leakage.

16. The network device of claim 15, wherein the performing of the remedial action at the network device comprises one or more of blocking the network device from communicating with a third-party system over a network, preventing data associated with the data leakage from being gathered at the webpage, or preventing data associated with the data leakage from being stored at the network device, or some combination thereof.

17. The network device of claim 15, wherein:
   the detecting, at the headless browser, of the data leakage from the webpage comprises detecting, at the headless browser, the data leakage due to a third-party script of the webpage listening for input events on the webpage; and the input events comprise one or more of keyboard input events, or mouse input events, or some combination thereof.

18. The network device of claim 15, wherein the detecting, at the headless browser, of the data leakage from the webpage comprises detecting, at the headless browser, the data leakage due to outbound data flows from the webpage to a third-party system.

19. The network device of claim 18, wherein the outbound data flows from the webpage to the third-party system comprise an outbound request to a third-party domain that is different than a domain of the webpage.

20. The network device of claim 15, wherein the detecting, at the headless browser, of data leakage from the webpage comprises detecting, at the headless browser, the data leakage to a third-party system that is configured to occur on the webpage without the data leakage being presented in the browser or being known to the user.

* * * * *